(12) United States Patent
Lyon

(10) Patent No.: US 9,083,652 B2
(45) Date of Patent: Jul. 14, 2015

(54) CROWD BASED CONTENT DELIVERY

(75) Inventor: Barrett Gibson Lyon, Pacifica, CA (US)

(73) Assignee: Fortinet, Inc., Sunnyvale, CA (US)

( * ) Notice: Subject to any disclaimer, the term of this patent is extended or adjusted under 35 U.S.C. 154(b) by 0 days.

(21) Appl. No.: 13/244,722

(22) Filed: Sep. 26, 2011

(65) Prior Publication Data

US 2013/0103520 A1    Apr. 25, 2013

Related U.S. Application Data

(63) Continuation of application No. 12/655,900, filed on Jan. 7, 2010.

(60) Provisional application No. 61/269,646, filed on Jun. 25, 2009.

(51) Int. Cl.
| | | |
|---|---|---|
| G06Q 99/00 | (2006.01) | |
| H04L 12/911 | (2013.01) | |
| G06Q 30/02 | (2012.01) | |
| G06Q 20/12 | (2012.01) | |
| G06Q 30/00 | (2012.01) | |
| G06F 15/16 | (2006.01) | |

(52) U.S. Cl.
CPC ............... *H04L 47/70* (2013.01); *G06Q 30/02* (2013.01); *G06F 15/16* (2013.01); *G06Q 20/1235* (2013.01); *G06Q 30/00* (2013.01)

(58) Field of Classification Search
CPC ..... G06Q 20/1235; G06Q 30/00; G06F 15/16
USPC ............................................. 705/51; 709/226
See application file for complete search history.

(56) References Cited

U.S. PATENT DOCUMENTS

| | | |
|---|---|---|
| 6,085,193 A | 7/2000 | Malkin et al. |
| 6,785,704 B1 | 8/2004 | McCanne |
| 7,305,252 B2 | 12/2007 | Britt et al. |
| 7,391,768 B1 | 6/2008 | Samprathi et al. |
| 7,526,562 B1 | 4/2009 | Samprathi et al. |
| 7,653,689 B1 * | 1/2010 | Champagne et al. ......... 709/206 |
| 7,657,642 B2 | 2/2010 | Blanchet |
| 7,860,964 B2 | 12/2010 | Brady et al. |
| 8,429,630 B2 * | 4/2013 | Nickolov et al. ............. 717/148 |
| 2002/0010783 A1 | 1/2002 | Primak et al. |
| 2002/0116444 A1 | 8/2002 | Chaudhri et al. |
| 2002/0161890 A1 | 10/2002 | Chen |
| 2003/0046703 A1 | 3/2003 | Knowles et al. |
| 2003/0149581 A1 * | 8/2003 | Chaudhri et al. ................. 705/1 |
| 2005/0010537 A1 * | 1/2005 | Ettinger .......................... 705/80 |

(Continued)

OTHER PUBLICATIONS

Final Rejection for U.S. Appl. No. 13/194,825 mailed Oct. 9, 2014.
Non-Final Rejection for U.S. Appl. No. 13/194,825 mailed Jun. 16, 2014.
Final Rejection for U.S. Appl. No. 13/194,825 mailed Aug. 8, 2013.

(Continued)

*Primary Examiner* — James D Nigh
(74) *Attorney, Agent, or Firm* — Hamilton, DeSanctis & Cha LLP

(57) ABSTRACT

Crowd based content delivery is disclosed. In some embodiments, managing content delivery includes receiving a specification from a resource provider of an availability of a content delivery service at the resource provider, selecting the resource provider to service requests for a content item, facilitating caching of the content item at the resource provider, and redirecting a request for the content item to the resource provider for servicing.

20 Claims, 7 Drawing Sheets

(56) References Cited

U.S. PATENT DOCUMENTS

| | | | |
|---|---|---|---|
| 2006/0242072 A1* | 10/2006 | Peled et al. | 705/51 |
| 2007/0168440 A1 | 7/2007 | Cobelens | |
| 2007/0294419 A1* | 12/2007 | Ulevitch | 709/230 |
| 2008/0215718 A1 | 9/2008 | Stolorz et al. | |
| 2009/0055891 A1* | 2/2009 | Okamoto et al. | 726/1 |
| 2009/0262741 A1* | 10/2009 | Jungck et al. | 370/392 |
| 2009/0276771 A1* | 11/2009 | Nickolov et al. | 717/177 |
| 2009/0327517 A1 | 12/2009 | Sivasubramanian et al. | |
| 2010/0042743 A1 | 2/2010 | Jeon et al. | |
| 2010/0325240 A1 | 12/2010 | Drako et al. | |
| 2011/0016214 A1* | 1/2011 | Jackson | 709/226 |
| 2013/0103556 A1 | 4/2013 | Lyon | |
| 2013/0254385 A1 | 9/2013 | Lyon | |

OTHER PUBLICATIONS

IPv6 Tunnel Broker with the Tunnel Setup Protocol (TSP), RFC 5572 submitted on Feb. 2010.

Evaluation of IPv6 Auto-Transition Algorithm, IETF Internal-Draft submitted on Oct. 24, 2004.

Non-Final Rejection for U.S. Appl. No. 13/194,825 mailed Feb. 27, 2013.

Non-Final Rejection for U.S. Appl. No. 13/020,762 mailed Oct. 23, 2014.

Non-Final Rejection for U.S. Appl. No. 12/655,900, mailed Mar. 2, 2012.

Final Rejection for U.S. Appl. No. 121655,900, mailed Nov. 8, 2012.

Non-Final Rejection for U.S. Appl. No. 13/020,762 mailed Apr. 11, 2014.

* cited by examiner

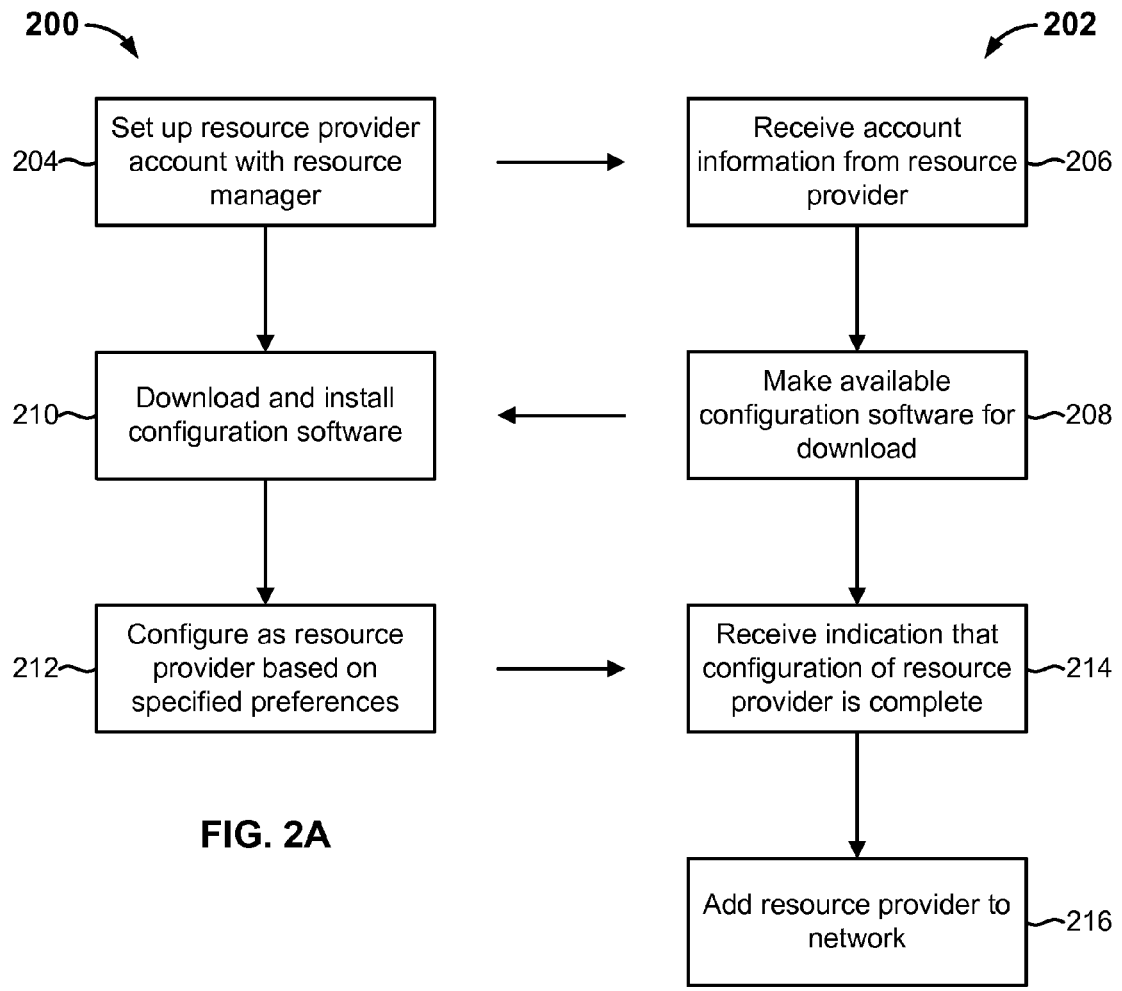

CROWD BASED CONTENT DELIVERY

CROSS REFERENCE TO OTHER APPLICATIONS

This application is a continuation of co-pending U.S. patent application Ser. No. 12/655,900, entitled CROWD BASED CONTENT DELIVERY filed Jan. 7, 2010 which is incorporated herein by reference for all purposes and which claims priority to U.S. Provisional Patent Application No. 61/269,646, entitled SYSTEM FOR OPERATING A CROWD BASED COMPUTING PLATFORM filed Jun. 25, 2009 which is incorporated herein by reference for all purposes.

BACKGROUND OF THE INVENTION

Many network entities have excess computing resources that are unused and wasted. It would be useful to create a marketplace for these otherwise untapped resources.

BRIEF DESCRIPTION OF THE DRAWINGS

Various embodiments of the invention are disclosed in the following detailed description and the accompanying drawings.

FIGS. 2A-2B illustrate embodiments of processes for adding a resource provider to the network managed by the resource manager.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims, and the invention encompasses numerous alternatives, modifications and equivalents. Numerous specific details are set forth in the following description in order to provide a thorough understanding of the invention. These details are provided for the purpose of example, and the invention may be practiced according to the claims without some or all of these specific details. For the purpose of clarity, technical material that is known in the technical fields related to the invention has not been described in detail so that the invention is not unnecessarily obscured.

Figure 1:
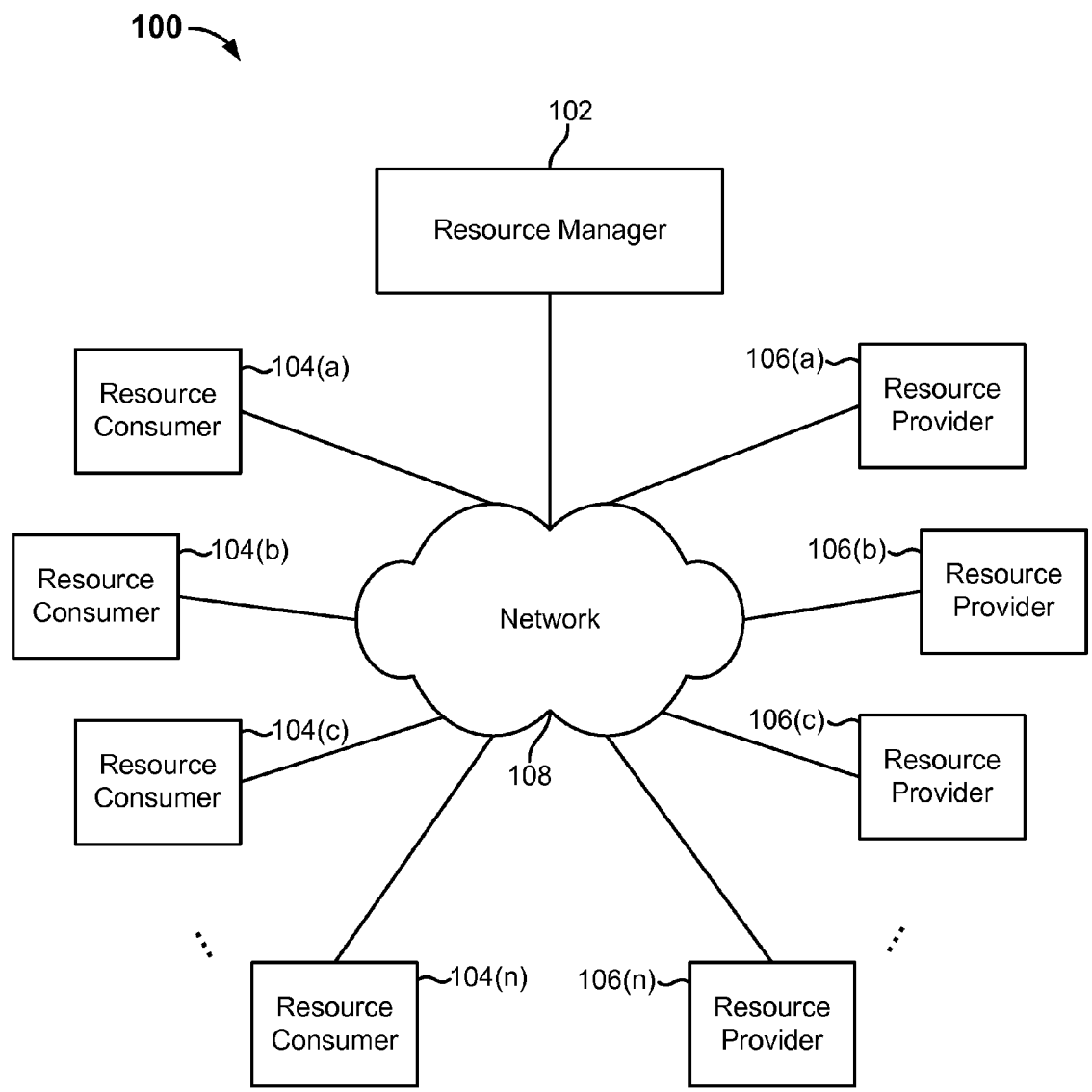
FIG. 1 is a block diagram illustrating an embodiment of a network environment for operating a crowd based computing platform.

FIG. 1 is a block diagram illustrating an embodiment of a network environment 100 for operating a crowd based computing platform. Resource manager or aggregator 102 facilitates transactions between resource consumers 104 and resource providers 106. The various entities comprising network environment 100 communicate via network 108, which may comprise any public or private network such as a LAN, WAN, the Internet, etc., using any appropriate communication protocol such as HTTP (Hypertext Transfer Protocol), SSL (Secure Sockets Layer), RTMP (Real Time Messaging Protocol), RTMP-E (Encrypted Real Time Messaging Protocol), RTMP over HTTP, torrent style protocols, etc. Resource manager 102 manages any one or more types of computing resources for performing tasks such as, but not limited to, content distribution or delivery, parallel processing, security, storage, etc. Although depicted as a single entity in network environment 100, resource manager 102 may comprise a plurality of interconnected computing systems that perform the various tasks associated with managing resources. Resource providers 106 comprise a crowd of members who donate or sell their resources to resource consumers 104. Any type of member may be a part of the crowd of resource providers 106 such as individuals, groups, corporations, universities, content delivery networks (CDNs), internet service providers (ISPs), carriers, cloud computing networks, server farms, etc. Resource manager 102 handles various processes associated with the exchange of resources between resource providers 106 and resource consumers 104 such as monitoring performance, tracking statistics, enforcing provider and consumer preferences, providing security, billing, etc. Although a single resource manager 102 is depicted in network environment 100, a plurality of networked resource managers may be deployed across various geographical regions, e.g., to manage resource providers and resource consumers across the world.

As further described herein, the resource manager establishes and manages a confederation of resource providers. A resource provider may comprise any network node that has extra capacity that can be provided or sold to consumers who need the resource. A resource provider, for example, may set a price for an available resource, and if a consumer finds that resource attractive, the consumer pays for the right to use it. In some embodiments, the resource manager assists a resource provider in becoming a CDN or CDN node that is capable of delivering content on behalf of a content publisher, i.e., the resource consumer in this case. In some such cases, for example, the resource manager provides configuration software which when installed on one or more servers of the resource provider configures the servers to behave as CDN nodes. A resource provider configured as a CDN node may be employed to serve content based on the availability of resources at the node, which may vary based on factors such as current load, day and time, geographic location, etc.

Although many of the given examples are with respect to crowd based content delivery, the techniques described herein may be employed with respect to any computing resource and/or task. The described techniques allow excess capacity of resource providers that is otherwise unused and wasted to be utilized and/or monetized. For example, even though many ISP and carrier networks are bidirectional (e.g., a 10 Gigabit connection comprises 10 Gigabit inbound and 10 Gigabit outbound), they typically have significantly more inbound traffic due to users downloading content than outbound traffic due to relatively fewer users uploading content, resulting in a large amount of unused outbound bandwidth. These networks typically only pay for one direction of traffic, either ingress or egress, whichever is greater. Since inbound traffic usually eclipses outbound traffic, the networks commonly have a large amount of free idle outbound bandwidth. It would be useful, for example, to add servers at these networks and configure them as CDN nodes so that the extra available outbound bandwidth can be utilized and/or monetized using the techniques described herein.

FIGS. 2A-2B illustrate embodiments of processes for adding a resource provider to the network managed by the resource manager. In some cases, the processes may be employed to configure a network node to become a CDN node capable of delivering content on behalf of a content publisher. Process 200 is employed by a resource provider such as any of resource providers 106 of FIG. 1 or resource provider 608(a) of FIG. 6A; and process 202 is employed by a resource manager such as resource manager 102 of FIG. 1, resource manager 500 of FIG. 5A, or resource manager 602 of FIGS. 6A-6C. Process 200 starts at 204 at which a resource provider sets up an account with the resource manager, e.g., via a web site and/or interface made available by the resource manager. Various parameters that define the terms and conditions with respect to which the resource provider is willing to provide resources or services are specified with respect to the resource provider's account. For example, the types of resources and/or the services that the resource provider is willing to deliver and/or perform may be specified. In the cases in which it is desired to configure the resource provider as a CDN node, for instance, a proxy server option is selected. The specification of resources may further include a specification of the amount or percentage of a total resource (e.g., hard drive, memory, CPU, network bandwidth, etc.) to be made available, which may be specified as a function of time. Moreover, resource consumers and/or types of resource consumers may be specified, e.g., on an inclusion or exclusion basis. The various entities permitted to use and/or excluded from using the resource provider's resources may be specified or selected by name and/or by the nature of their business. For example, in some cases, any nonprofit organization may be permitted to use the resource provider's resources while in other cases only one or more specified entities may be permitted. Similarly, content types for using the resources or services with may be specified, e.g., on an inclusion or exclusion basis. For example, in some cases, any content type other than adult content may be specified as permissible.

Furthermore, prices at which the resource provider is willing to provide resources or services may be specified. Different prices may be specified based on different criteria such as consumer or consumer type, content type, time of use, etc. For instance, resources may be donated or provided for free to nonprofit organizations but charged a specified price per unit from other consumers and different prices may be specified for different consumers; higher prices may be specified for use of resources with respect to certain types of content such as adult content; prices may be specified as functions of time and/or date, e.g., higher prices may be specified during business hours when the resource provider has peak loads than during nights, weekends, and holidays; etc. Other information such as the geographic location of the resources, environmental considerations such as the carbon footprint for providing a resource or service, etc., may also be specified. The various parameters described may be separately specified for each machine or server available at the resource provider. The account information provided at 204 is received by the resource manager at 206 of process 202. In some embodiments, steps 204 and 206 include the resource provider acquiring and being granted by the resource manager a resource provider identifier and key or password via which the resource provider's account with the resource manager may be accessed. In various embodiments, the parameters and information described above as being specified with respect to a resource provider's account may be specified during initial registration or at a later time and may be later updated or changed as applicable. Other parameters in addition to and/or instead of those described may be specified as applicable.

Software for configuring a node as a resource provider made available by the resource manager at 208 is downloaded and installed by the resource provider at 210. In various embodiments, the software may comprise an application, an operating system, a server instance such as a Java Virtual Machine, a specialized C proxy application such as Varnish that runs on a server, a plug-in for a browser or any other application or interface, etc. One or more parameters or preferences specified with respect to the resource provider's account with the resource manager may be retrieved during installation of the software at 210. In some embodiments, one or more parameters or preferences may be specified during installation at 210 rather than during step 204 as described above. The configuration software is installed at 210 on each computer or machine desired to be configured as a resource provider. At 212, the software installed on a machine appropriately configures the machine as a resource provider based on the preferences specified. For example, a machine may be configured by the software at 212 to function as a caching proxy server. In some embodiments, the software conducts one or more performance tests at 212 to assess the quality of the available resources. For example, performance tests on the hard drive, memory, CPU, network connections, etc., may be performed. Once a node has been configured as a resource provider at 212, an indication that the configuration is complete is communicated by the software and received by the resource manager at 214. In some embodiments, the resource manager receives at 214 the results of the performance tests conducted at 212. The results of the performance tests are reported to the resource manager so that the resource manager can appropriately market and provide or sell the resources to resource consumers. In some embodiments, performance tests are periodically conducted by the software at the resource provider and reported back to the resource manager so that the resource manager is always aware of changes in performance levels and can make appropriate use of the resources of the resource provider. At 216, the resource provider is added to the network managed by the resource manager.

Figures 3A, 3B:
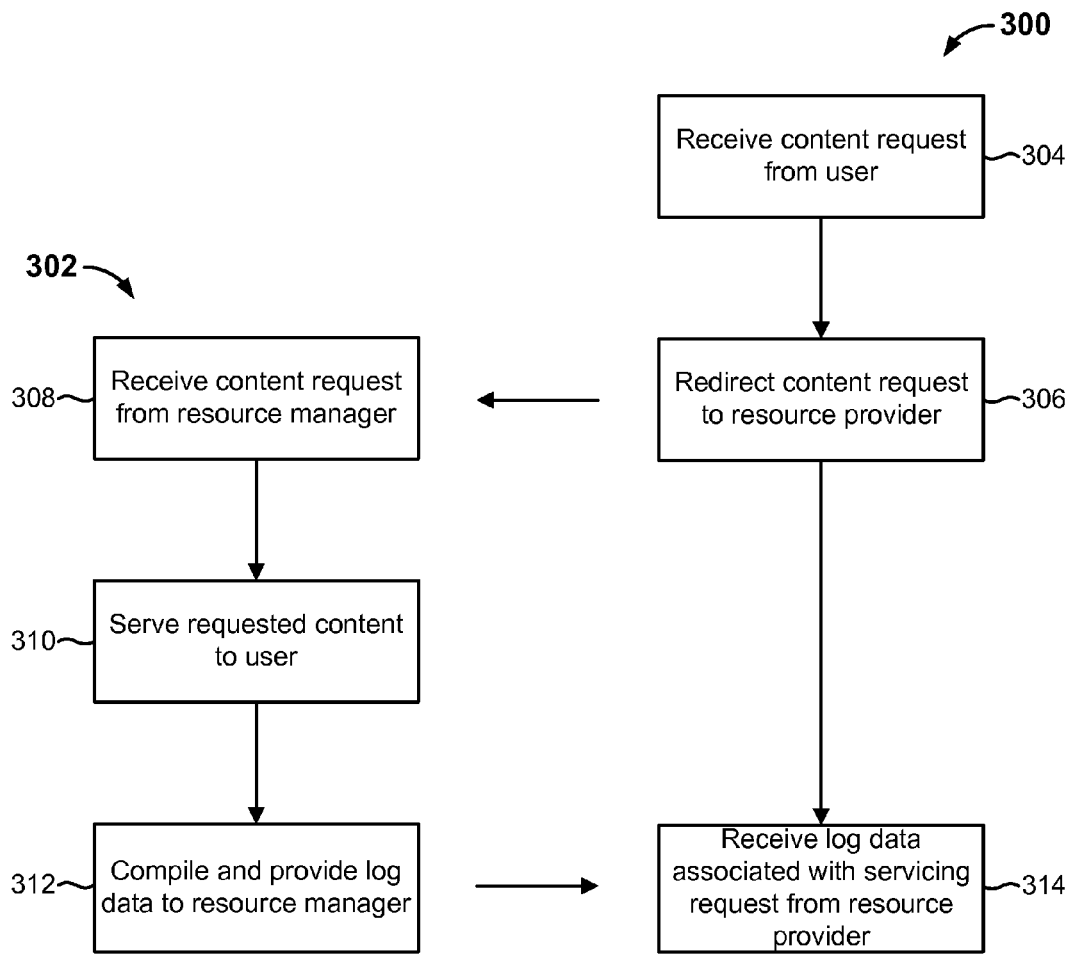
FIGS. 3A-3B illustrate embodiments of processes for employing a resource provider configured as a proxy server to service a content request.

FIGS. 3A-3B illustrate embodiments of processes for employing a resource provider configured as a proxy server to service a content request. Process 300 is employed by a resource manager such as resource manager 102 of FIG. 1, resource manager 500 of FIG. 5A, or resource manager 602 of FIGS. 6A-6C; and process 302 is employed by a resource provider such as any of resource providers 106 of FIG. 1 or resource provider 608(*a*) of FIG. 6A. Process 300 starts at 304 at which a content request is received by the resource manager from a user. The requested content, for example, is published by a content publisher that uses content delivery resources and is the resource consumer in this case. In this example, the content publisher subscribes to the services of the resource manager for facilitating the servicing of requests for content published by the content publisher, and the requests for the publisher's content from individual users are directed or redirected to the resource manager. At 306, the content request received at 304 is redirected by the resource manager, e.g., via an HTTP 302 redirect (or similar content redirect action in other protocols such as RTMP), to a resource provider capable of servicing the request and permitted by the resource consumer to service the request. The redirected content request is received by the resource provider at 308, and the requested content is served by the resource provider to the user who requested the content at 310. In some embodiments, the requested content is already cached at the resource provider when it receives the request at 308. In other embodiments, the resource provider obtains and caches the requested content from an origin of the content publisher in response to receiving the request at 308. Log data of the transaction, which includes information associated with delivering the requested content (such as the file identifier, timestamp of delivery, the source and/or destination IP addresses, the file size, the bandwidth consumed, the price or cost for delivery, etc.), is compiled by the software at the resource provider and communicated to the resource manager at 312. In some embodiments, the log data at least in part comprises a W3C web server log. The log data is received by the resource manager at 314. In some embodiments, the log data received at 314 is parsed, aggregated, and/or stored at the resource manager and may, for example, be later employed for billing the associated resource consumer and reimbursing the resource provider.

Figures 4A, 4B:
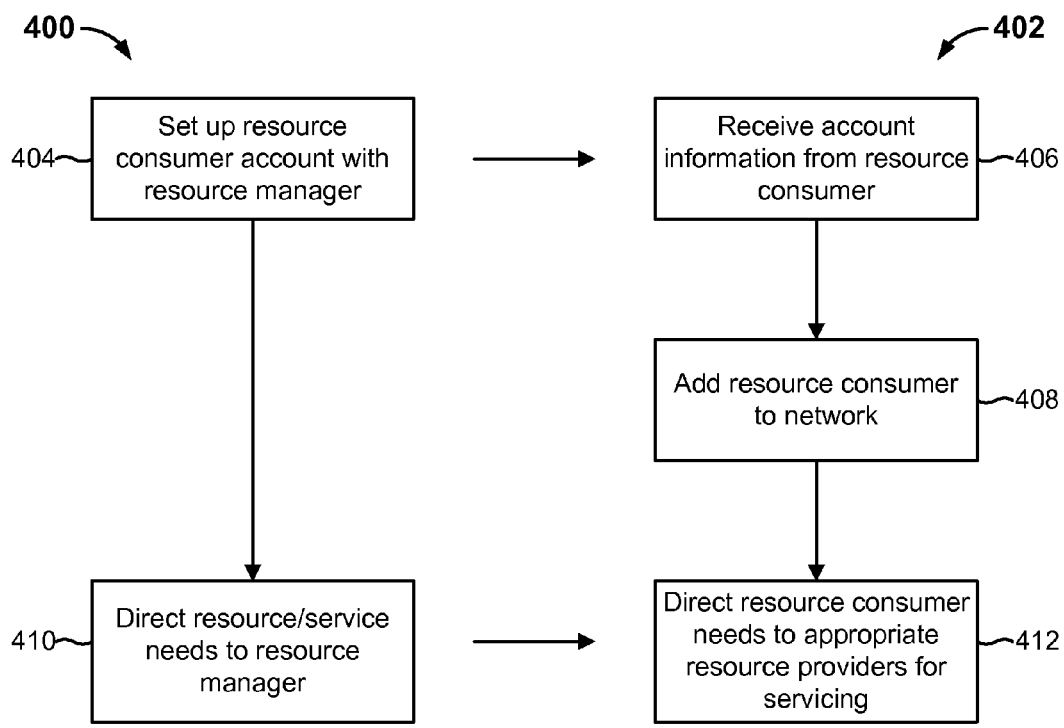
FIGS. 4A-4B illustrate embodiments of processes for adding a resource consumer to the network managed by the resource manager.

FIGS. 4A-4B illustrate embodiments of processes for adding a resource consumer to the network managed by the resource manager. Process 400 is employed by a resource consumer such as any of resource consumers 104 of FIG. 1; and process 402 is employed by a resource manager such as resource manager 102 of FIG. 1, resource manager 500 of FIG. 5A, or resource manager 602 of FIGS. 6A-6C. Process 400 starts at 404 at which a resource consumer sets up an account with the resource manager, e.g., via a web site and/or interface made available by the resource manager. Various parameters that define the terms and conditions with respect to which the resource consumer is willing to use or purchase resources or services are specified with respect to the resource consumer's account. For example, the types of resources and/or services that the resource consumer desires to use or purchase as well as the types of content with respect to which the resource consumer expects to use the resources and services may be specified. For instance, the resource consumer may sign up for content delivery services for serving video content. Furthermore, other criteria such as the required quality or performance levels, the required security levels, etc., may be specified. In addition, resource providers and/or resource provider types may be specified, e.g., on an inclusion or exclusion basis. The various entities permitted to provide and/or excluded from providing resources or services to the resource consumer may be specified or selected by name and/or by type. For example, a content publisher seeking content delivery services may not allow untrusted members of the crowd such as random individual users to serve their content but may allow trusted entities, such as prominent ISPs or carriers, to serve their content. Moreover, prices or price ranges that the resource consumer is willing to pay for various resources and services may be specified. Different prices may be specified based on different criteria such as resource provider or provider type, content type, time of use, etc. Other information such as geographic location, environmental considerations such as the permissible carbon footprint for obtaining a resource or service, etc., may also be specified. The various parameters described may be separately specified for each resource or service or type of resource or service desired by the resource consumer.

The account information provided at 404 is received by the resource manager at 406 of process 402. In some embodiments, steps 404 and 406 include the resource consumer acquiring and being granted by the resource manager a resource consumer identifier and key or password via which the resource consumer's account with the resource manager may be accessed. In various embodiments, the parameters and information described above as being specified with respect to a resource consumer's account may be specified by the resource consumer during initial registration or at a later time and may be later updated or changed as applicable. Other parameters in addition to and/or instead of those described may be specified by the resource consumer as applicable. With respect to a content publisher signing up for content delivery services, for example, content origin locations where the content is published may be specified; and/or CDN providers with which the content publisher has contracts, if any, and the terms of those contracts may be specified so that those CDN providers may be used to service content requests. The resource consumer is added to the network managed by the resource manager at 408. Once the resource consumer subscribes with the resource manager for a particular resource and/or service, needs for that resource and/or service are directed by the resource consumer to the resource manager at 410. With respect to content delivery, for example, when a content publisher subscribes to the services of the resource manager for servicing content requests, the content publisher ensures that user requests for content published by the content publisher are directed or redirected to the resource manager. Resource consumer needs are, in turn, directed for servicing to appropriate resource providers in the network by the resource manager at 412 based on the preferences specified by the resource consumer. In some embodiments, a network node may sign up both as a resource provider and a resource consumer for the same or different resources, e.g., using process 200 and 202 of FIGS. 2A-2B and processes 400 and 402 of FIGS. 4A-4B.

Figure 5A:
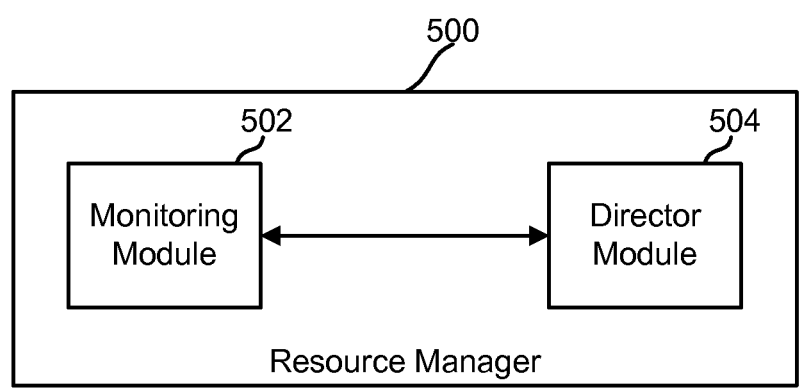
FIG. 5A is a block diagram illustrating an embodiment of a resource manager.

The resource manager comprises one or more networked modules, each of which may comprise one or more hardware and/or software components. FIG. 5A is a block diagram illustrating an embodiment of a resource manager 500. For example, resource manager 500 may comprise resource manager 102 of FIG. 1 or resource manager 602 of FIGS. 6A-6C. In the depicted embodiment, resource manager 500 comprises a monitoring module 502 and a director module 504. Monitoring module 502 monitors the health of the network and various nodes. Data may be received by or input into monitoring module 502 from a variety of sources, e.g., on the Internet. Different types of data may be input by different sources depending on the types of data available to them. In some embodiments, the data comprises performance statistics associated with quality of service and end user experience such as average and/or maximum throughput, DNS lookup time, time to first connection, download time, etc. In some cases, dedicated monitoring servers may be placed across the network that report back various performance characteristics. In some cases, log data compiled by resource providers at the conclusion of each transaction and/or logs of open proxy servers may be input into monitoring module 502. In some cases, plug-ins may be included in sources such as web browsers, media players, download agents, etc., that ping back the performance statistics available to them. The data received by monitoring module 502 is parsed, analyzed, aggregated, and/or stored. In some embodiments, various entities may desire to obtain and/or purchase performance statistics on their nodes and/or networks. In such cases, the relevant data compiled by monitoring module 502 may be presented or reported, e.g., via a dashboard, to the entity, i.e., the resource consumer in this case. For example, a CDN may be interested in monitoring the health of its nodes so that a prescribed quality of service can be maintained, and a server farm may find a real time dashboard providing statistics on inbound and outbound traffic useful.

Director module 504 receives requests for resources or services and selects appropriate resource providers to service the requests based on the preferences specified by the resource consumers and resource providers. In some embodiments, decisions for selecting resource providers are made by director module 504 based at least in part on the data collected and/or information learned by monitoring module 502. With respect to content delivery, for example, if a portion of a CDN in a particular geographical region goes down, existence of the black spot (i.e., a poorly performing area in a network or geography) in the CDN is quickly learned by monitoring module 502 and communicated to director module 504 so that content requests are not redirected by director module 504 to at least those nodes of the CDN. A prescribed quality of service and user experience is maintained in the network managed by traffic manager 500 by making decisions based on the current state of the network and its constituent nodes as determined by monitoring module 502. In some embodiments, monitoring module 502 includes a spider process that monitors the requests coming into resource manager 500 and that crawls the network managed by resource manager 500 to determine and/or report the availability of various resource providers to service incoming requests. With respect to content delivery, for example, the spider learns and stores the locations of content items (i.e., files) in the network. For instance, the spider may interrogate a CDN using an appropriate interrogation methodology (e.g., an HTTP HEAD request or similar request in RTMP or other protocols) to determine the availability of a particular content item at the CDN. The spider may also coordinate pre-fetching of a content item at a node to warm the cache at the node before a request for that content item is redirected to the node by director module 504. Thus, the spider assists director module 504 in directing a request to a resource provider capable of servicing the request. In some embodiments, decisions for selecting resource providers are made by director module 504 based at least in part on past traffic redirected to the resource providers, e.g., to prevent any given resource provider from becoming overloaded and/or to load balance a plurality of available resource providers. In some embodiments, information associated with the requests redirected by director module 504 (such as the resource requested, the user and/or resource consumer issuing the request, the resource provider selected to service the request, the type and amount of resources expected to service the request, the resource provider price for servicing the request, etc.) may be logged and stored at the resource manager and later employed, e.g., to generate statistics or for billing purposes.

Figure 5B:
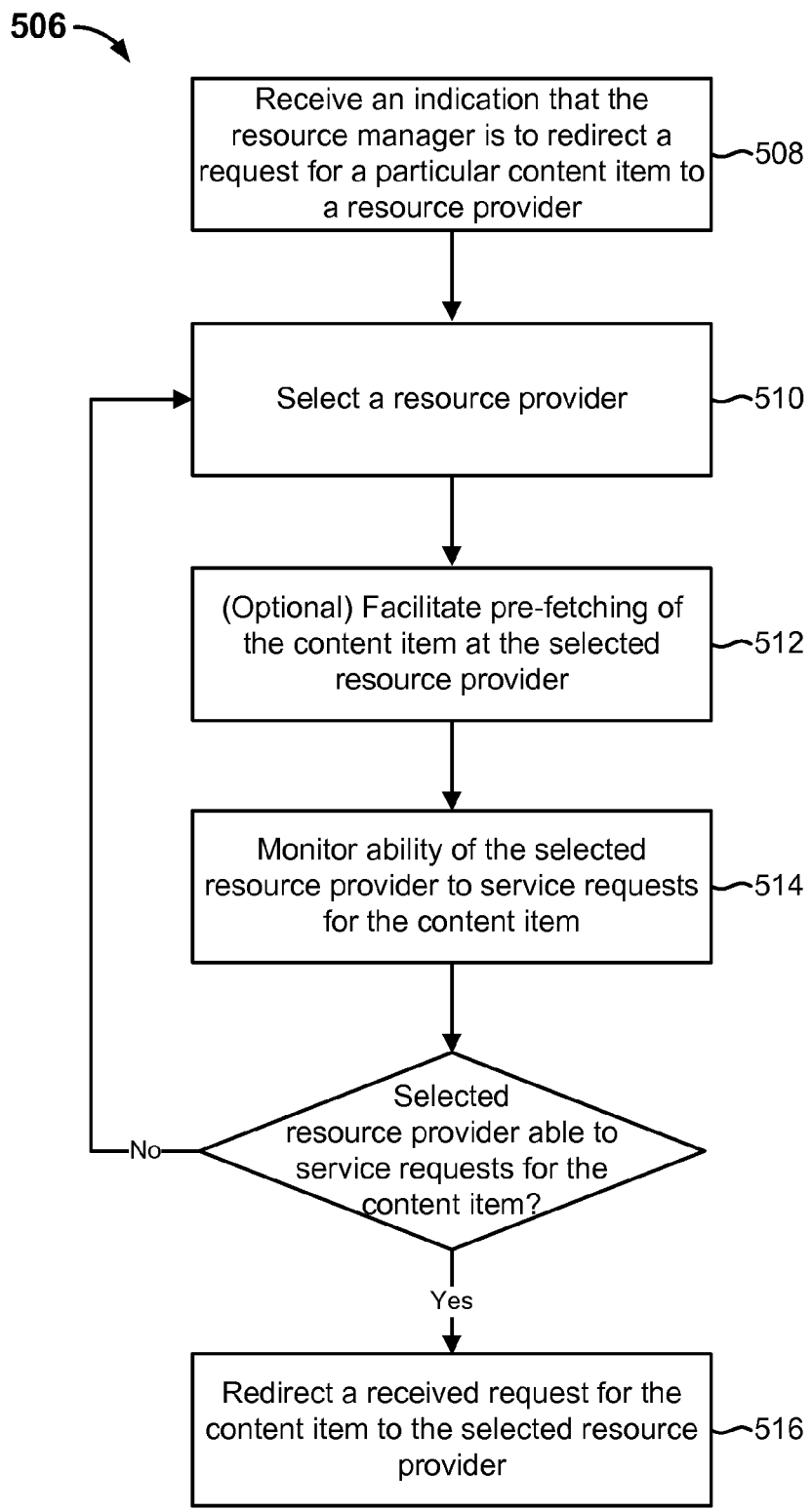
FIG. 5B illustrates an embodiment of a process for redirecting a request for a content item to a resource provider.

FIG. 5B illustrates an embodiment of a process for redirecting a request for a content item to a resource provider. Process 506 is employed by a resource manager such as resource manager 102 of FIG. 1, resource manager 500 of FIG. 5A, or resource manager 602 of FIGS. 6A-6C. In various embodiments, process 506 may be employed in anticipation of receiving a request for a content item or in response to receiving a request for a content item. Process 506 starts at 508 at which an indication that the resource manager is to redirect a request for a particular content item to a resource provider capable of servicing the request is received. In some embodiments, the indication is received from the publisher of the content item, i.e., the resource consumer in this case, such as via the publisher's account with the resource manager or via learning from the publisher origin the content published by the publisher. In some embodiments, the indication is received in response to a (previous) request for that content item being forwarded or redirected to and/or received by the resource manager. At 510, an appropriate resource provider capable of servicing requests for the content item is selected, e.g., based on the preferences specified by the content publisher. In some embodiments, the selected resource provider comprises a network node configured as a proxy server, e.g., via process 200 of FIG. 2A. In some embodiments, the selected resource provider comprises a CDN. In some such cases, the content publisher may have specified using the CDN to service requests, e.g., based on the terms of an existing contract with the CDN. In some embodiments, a resource provider able to service requests for the content item at a least cost to the publisher but at the required security and/or quality level is selected at 510. At 512, the resource manager may optionally facilitate pre-fetching of the content item at the selected resource provider to warm the cache at the resource provider. The ability of the selected resource provider to service requests for the content item in accordance with the preferences specified by the content publisher is monitored at 514, e.g., by a spider process of monitoring module 502 of FIG. 5A. In some embodiments, the availability of the content item at the selected resource provider is also monitored at 514; and if the content item is at some point determined to be unavailable, in some cases process 506 may be redirected to step 512 (not shown in FIG. 5B). A received request for the content item is redirected, e.g., by director module 504 of FIG. 5A, to the selected resource provider at 516 in the event that the selected resource provider is able to service the request. In the event that the selected resource provider is unable to service a received request for the content item, a different resource provider capable of servicing the request is selected at 510.

Figure 6A:
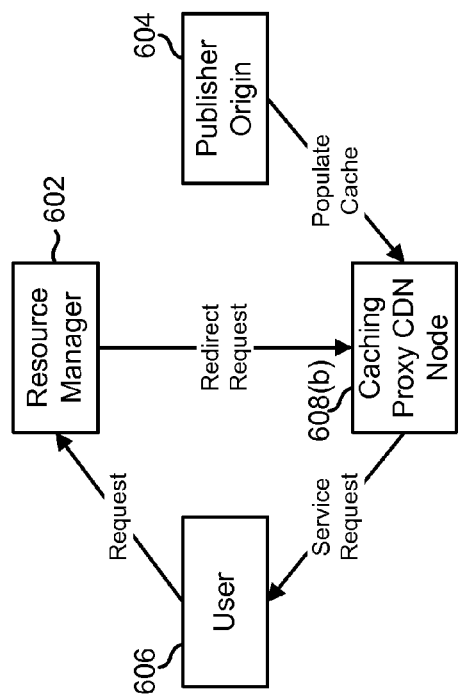
FIGS. 6A-6C are block diagrams illustrating embodiments of manners in which a content request from an end user is redirected by the resource manager to a node capable of servicing the request.
Figure 6B:
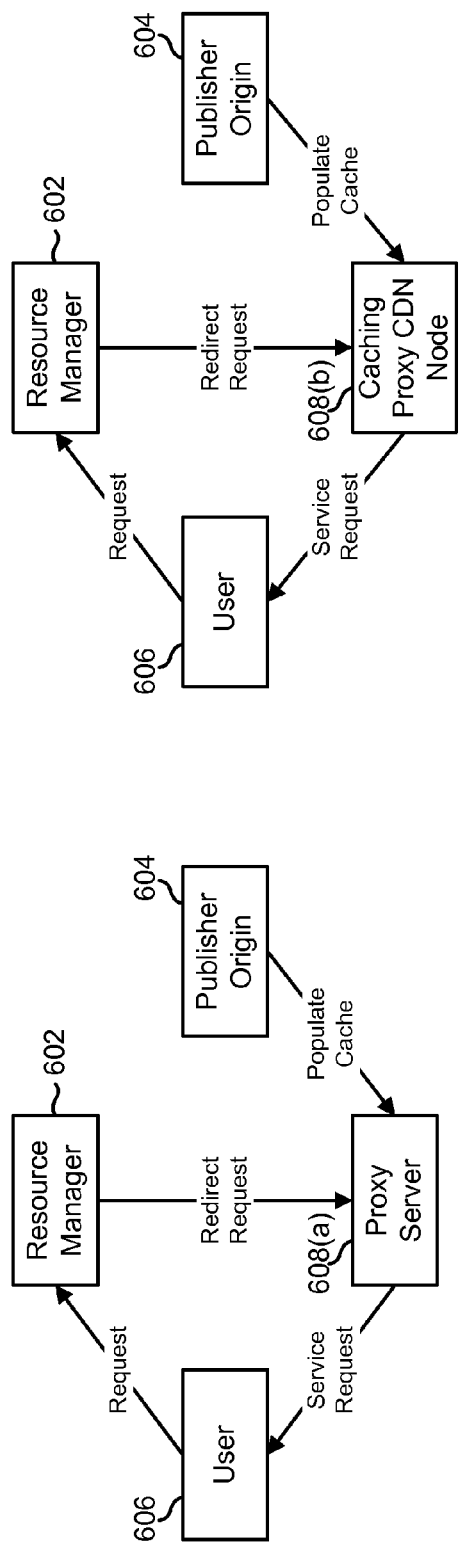
Figure 6C:
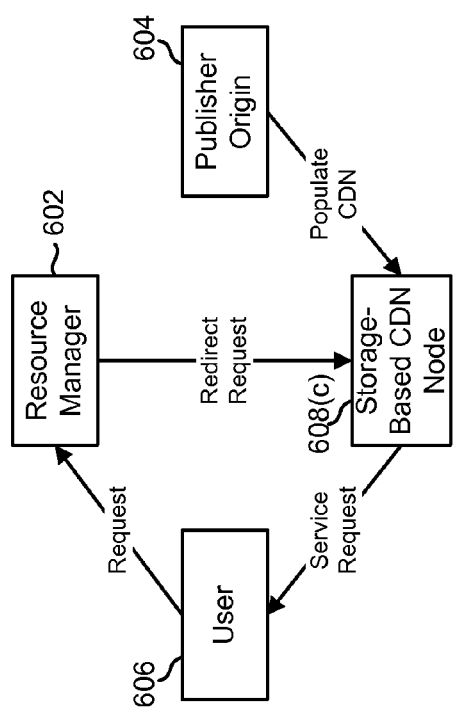

FIGS. 6A-6C are block diagrams illustrating embodiments of manners in which a content request from an end user is redirected by the resource manager to a node capable of servicing the request. In the network environments depicted in the examples of FIGS. 6A-6C, the resource consumer comprises a content publisher that has subscribed to the services of the resource manager for servicing user requests for content published by the content publisher. When signing up for the services of resource manager 602 (e.g., at 404 of process 400 of FIG. 4A), the content publisher specifies the locations of one or more associated publisher origins 604 from which content published by the content publisher can be obtained and cached at other nodes. A request from user 606 for content (e.g., a file) published by the publisher is directed or redirected to resource manager 602. For example, the request may comprise a hyperlink or URL that redirects to resource manager 602. Resource manager 602 selects an appropriate node 608 to service the request based on the preferences specified by the content publisher and redirects the request to node 608. In various embodiments, the requested content may be obtained by node 608 from publisher origin 604 (or from another node at which the content is available) either prior to receiving the redirected request or in response to receiving the redirected request. Node 608 provides the requested content to user 606, fulfilling servicing of the original request. In some embodiments, the various redirections of the original request are transparent to the user. In some embodiments, a set of one or more initial requests for a content item may be redirected by resource manager 602 to publisher origin 604 and serviced by publisher origin 604 (not shown in FIGS. 6A-6C), e.g., when the requested content item has not yet been populated at other nodes 608 or when the existence of the requested content item at various other nodes 608 is unknown to resource manager 602.

In the example of FIG. 6A, the request is redirected by resource manager 602 to a node 608(*a*) configured (e.g., via process 200 of FIG. 2A) to at least in part function as a proxy server. Proxy server 608(*a*) comprises a confederated node of the network managed by resource manager 602 since it has willingly signed up to be a part of the network. In some embodiments, a spider process of the monitoring module of resource manager 602 coordinates pre-fetching of a content item at the proxy server cache before any request for that content item is redirected to proxy server 608(*a*) so that the request is redirected to a warm cache. Alternatively, proxy server 608(*a*) may obtain and cache the requested content item in response to receiving a first request for the content item or a first request for the content item after a previous copy of the content item has been purged from its cache. A cached copy of the content item at proxy server 608(*a*) is deleted from the cache at the expiration time associated with the cached copy, and a new copy of the content item may subsequently be obtained to refresh the cache. A transaction log for servicing the request is compiled at proxy server 608(*a*) and provided to resource manager 602, e.g., so that it can be used by resource manager 602 to bill the content publisher and reimburse the provider of proxy server 608(*a*).

The content publisher may require security between the proxy server cache and the publisher origin. In some embodiments, content is both transacted from the publisher origin securely and locally cached securely using an encryption algorithm to prevent spreading of the content to nodes configured to serve it and to ensure integrity of the caches at the nodes. In some embodiments, the software installed on a node to configure it as a proxy server includes a built in shared secret that is employed to encrypt files that are stored in the local cache, to access the remote origin, and to sign transaction logs. Such a security system may also include an auto-update mechanism to update the shared secret along with monitoring to disable nodes that attempt to tamper with the log signatures. The transaction logs are signed using the shared secret. Each chunklet of log data sent back to the resource manager includes a timestamp and a hash of the entire log chunklet, which includes the shared secret. When the resource manager receives the log chunklet, it verifies the data by performing the same hash and compares the received hash with its locally generated hash.

In the example of FIG. 6B, the request is redirected by resource manager 602 to a node 608(*b*) of a caching proxy CDN. In this example, the content publisher has a pre-existing contract with the caching proxy CDN and thus requires at least a portion or a specified amount or percentage of its traffic to be serviced by this CDN. The terms of the content publisher's contract with the CDN may be specified, for example, with respect to its account with resource manager 602 (e.g., at 404 of process 400 of FIG. 4A). As previously described, a spider process of the resource manager may coordinate ensuring that a content item is available at a node before any request for that content item is redirected to that node so that the request is redirected to a warm cache. With respect to the example of FIG. 6B, the availability of the requested content item at CDN node 608(*b*) may be determined via an HTTP HEAD or other appropriate request to CDN node 608(*b*). If the content item does not already exist at the CDN node 608(*b*), in some cases, the spider may independently request the content item from CDN node 608(*b*) to warm the cache at the node prior to any actual user requests for the content item being redirected to the node. The spider may need to periodically re-learn the availability of the content item at the CDN node, e.g., since the content item may be deleted from the cache at the CDN node if it has not been recently served by the CDN node or at its expiry time. Alternatively, CDN node 608(*b*) may obtain and cache the requested content item in response to receiving a first request for the content item or a first request for the content item after a previous copy of the content item has been purged from its cache. CDN node 608(*b*) comprises a federated node of the network managed by resource manager 602 since the caching proxy CDN has been forced to become a part of the network managed by resource manager 602 due to its contract with the content publisher. Since CDN node 608(*b*) does not comprise a resource provider node established by resource manager 602, no log data is compiled and provided to resource manager 602 for servicing the request, and the CDN independently bills the content publisher for servicing the request. In some embodiments, the caching proxy CDN may choose to join the confederation of resource providers managed by the resource manager, e.g., via process 200 of FIG. 2A.

In the example of FIG. 6C, the request is redirected by resource manager 602 to a node 608(*c*) of a storage-based CDN. In this example, the content publisher has a pre-existing contract with the storage-based CDN and thus requires at least a portion or a specified amount or percentage of its traffic to be serviced by this CDN. The terms of the content publisher's contract with the CDN may be specified, for example, with respect to its account with resource manager 602 (e.g., at 404 of process 400 of FIG. 4A). The storage-based CDN may only store a subset of the content published by the content publisher. In some cases, the CDN may only store the most popular content published by the content publisher. With respect to a storage-based CDN, it is important for the resource manager to verify the availability of a content item at the CDN prior to redirecting any requests for that content item to the CDN because if the CDN does not have the requested content item a content not found error message (such as an HTTP 404 error message) is transmitted to the user who issued the request, with the resource manager remaining unaware that the request was not serviced. The availability of a content item at the CDN may, for example, be determined by a spider process of the resource manager via an HTTP HEAD or other appropriate request. The spider may need to periodically re-learn the availability of the content item, e.g., since the content item may be deleted from the CDN at its expiry time, which is learned by the spider from the HEAD request and stored at the resource manager. In some embodiments, the content publisher is instructed to not remove or delete a content item from the CDN prior to the expiry time of the content item and/or is instructed to notify the resource manager of any such action prior to expiry time so that the resource manager can ensure that a content request is only redirected to the CDN if it has the content item without having to interrogate the CDN for availability of the content item prior to redirecting every request for the content item. With respect to the example of FIG. 6C, the request is redirected to CDN node 608(*c*) because the requested content item is known by resource manager 602 to be available at CDN node 608(*c*). CDN node 608(*c*) comprises a federated node of the network managed by resource manager 602 since the storage-based CDN has been forced to become a part of the network managed by resource manager 602 due to its contract with the content publisher. Since CDN node 608(*c*) does not comprise a resource provider node established by resource manager 602, no log data is compiled and provided to resource manager 602 for servicing the request, and the CDN independently bills the content publisher for servicing the request. In some embodiments, the storage-based CDN may choose to join the confederation or resource providers managed by the resource manager, e.g., via process 200 of FIG. 2A. By installing the configuration software provided by the resource manager, the nodes of a storage-based CDN may be configured to behave as proxy servers, allowing the storage-based CDN to additionally operate as a caching proxy CDN.

As described in the examples of FIGS. 6B-6C, the resource manager may redirect traffic to a CDN based on the preferences and usage instructions specified by the content publisher. In some embodiments, the resource manager manages publisher contracts with a plurality of different CDNs and redirects publisher traffic based on the terms of the contracts, e.g., in a manner that minimizes content delivery costs to the publisher. For example, the resource manager may minimize or at least reduce a publisher's content delivery costs by intelligently using the bandwidth of one or more contracted CDNs that bill with the $95^{th}$ percentile billing model. With CDNs that use such burstable billing models, the resource manager may also maximize use of free burstable bandwidth, which on a monthly billing cycle translates to up to 36 hours of free bandwidth per CDN.

In various embodiments, any appropriate billing and settlement model may be employed in the system of resource consumers and resource providers managed by the resource manager. The resource manager keeps track of the participants involved in each transaction as well as details of the transaction, e.g., via the log data received at the conclusion of each transaction from the resource provider. During a (e.g., monthly) settlement process, payments are received from resource consumers and distributed to resource providers as applicable. The resource manager may take a small transaction fee or a small percentage of the payment for facilitating the transaction. In some cases, the resource manager may track and bill for the total number of managed requests. In addition, the resource manager may bill for special services such as cache warming, use of certain protocols, etc. In some embodiments, an a la carte billing model may be employed where each type of resource managed by the resource manager is billed on a per transaction basis, a feature basis, or a statistics basis. Alternatively, various types of resources may be bundled together to create packages and different service level offerings. With respect to content delivery, a resource consumer may be billed based on the volume or total bytes of traffic served. In such cases, for example, the cost of each transaction may be computed from the product of the price per byte at delivery time and the total bytes delivered for the transaction, which values may be obtained from the log data of the transaction provided by the resource provider at the time of the transaction. In some such cases, the resource manager may add a small surcharge to the price per byte or may bill a flat fee for facilitating the transaction. In other embodiments, the $95^{th}$ percentile value of a resource consumer may be determined across all resource providers over a billing cycle, e.g., by aggregating the data from the transaction logs provided by the resource providers. In some such cases, the $95^{th}$ percentile value is multiplied by the fraction of the total traffic over the billing cycle that a particular resource provider delivered to obtain the bandwidth value billable by that resource provider. In such cases, the resource manager may take a small percentage of the amount billed by the resource provider.

Although crowd based content delivery is described in many of the examples provided herein, the resource manager may be similarly employed to facilitate any crowd based computing platform. For example, in some embodiments, the resource manager may facilitate crowd based storage by which content items are replicated for storage across the crowd. In some embodiments, the resource manager may facilitate crowd based computing by which compute modules are distributed across the crowd to perform tasks such as video compression and encoding, encryption cracking, distributed web hosting and/or application execution, etc. In some embodiments, the resource manager may facilitate military purposes such as distributed network defense and offense mechanisms. For example, as a defense mechanism, the crowd may be employed as a distributed DDoS filter to protect from a DDoS attack. Likewise, as an offense mechanism, the crowd may be employed to generate such attacks.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for managing content delivery within a network, comprising:

receiving at a resource manager computer system coupled to the network and configured to facilitate servicing of requests for a content item published by a node of the network registered with the resource manager computer system as a resource consumer a specification of a resource consumer policy for servicing requests for the content item;

receiving at the resource manager computer system a specification from a node of the network registered with the resource manager computer system as a resource provider of a resource provider policy for using a content delivery service available at the resource provider;

determining using a processor of the resource manager computer system that the resource consumer policy for servicing requests for the content item and the resource provider policy for using the available content delivery service are compatible;

selecting, by the resource manager computer system, the resource provider to service at least a subset of requests for the content item;

facilitating caching of the content item at the resource provider; and redirecting, by a content redirect action of a communication protocol supported by the network, a received client request for the content item to the resource provider for servicing, wherein the resource provider is configured to service the client request by providing the content item to the requesting client.

2. The method of claim 1, wherein the resource provider policy includes a price for providing the content delivery service.

3. The method of claim 1, further comprising storing an account of the resource provider at the resource manager computer system, wherein terms and conditions for providing one or more resources, including the resource provider policy for the content delivery service, are specified and editable by the resource provider with respect to the account.

4. The method of claim 1, further comprising providing configuration software to the resource provider to configure the resource provider as a proxy server.

5. The method of claim 1, further comprising storing an account of a resource consumer at the resource manager computer system, wherein terms and conditions for procuring one or more resources, including the resource consumer policy for servicing requests for the content item, are specified and editable by the resource consumer with respect to the account.

6. The method of claim 1, wherein the resource consumer policy comprises a first resource consumer policy and the content item comprises a first content item and further comprising a specification of a second resource consumer policy for servicing requests for a second content item published by the consumer that is different form the first resource consumer policy.

7. The method of claim 1, wherein the resource provider comprises one of a plurality of resource providers having different resource provider policies for using available resources that are managed by the resource manager computer system.

8. The method of claim 1, wherein the resource consumer comprises one of a plurality of resource consumers having different resource consumer policies for procuring computing services that are managed by the resource manager computer system.

9. The method of claim 1, wherein facilitating caching of the content item at the resource provider comprises instructing the resource provider to pre-fetch the content item.

10. The method of claim 1, wherein the content item is cached at the resource provider in response to receiving the redirected request.

11. The method of claim 1, further comprising monitoring, by the resource manager computer system, an ability of the resource provider to service requests for the content item.

12. The method of claim 1, further comprising receiving, by the resource manager computer system, from the resource provider log data associated with servicing the redirected request.

13. The method of claim 1, further comprising billing the resource consumer for the content delivery service provided by the resource provider and reimbursing the resource provider for servicing the redirected request.

14. The method of claim 1, further comprising charging a fee for facilitating a transaction between the resource consumer that publishes the content item and the resource provider that services the redirected request for the content item.

15. A system for managing content delivery within a network, comprising:
 a processor configured to:
  receive a specification from a node of the network registered with the system as a resource consumer to facilitate servicing of requests for a content item published by the resource consumer based on a resource consumer policy for servicing requests for the content item;
  receive a specification from a node of the network registered with the system as a resource provider of a resource provider policy for using a content delivery service available at the resource provider;
  determine that the resource consumer policy for servicing requests for the content item and the resource provider policy for using the available content delivery service are compatible;
  select the resource provider to service at least a subset of requests for the content item;
  facilitate caching of the content item at the resource provider; and
  redirect, by a content redirect action of a communication protocol supported by the network, by a received client request for the content item to the resource provider for servicing, wherein the resource provider is configured to service the client request by providing the content item to the requesting client; and
 a memory coupled to the processor and configured to provide the processor with instructions.

16. The system of claim 15, wherein the memory is further configured to store an account of the resource provider, wherein terms and conditions for providing one or more resources, including the resource provider policy for the content delivery service, are specified and editable by the resource provider with respect to the account.

17. The system of claim 15, wherein the memory is further configured to store an account of the resource consumer, wherein terms and conditions for procuring one or more resources, including the resource consumer policy for servicing requests for the content item, are specified and editable by the resource consumer with respect to the account.

18. The system of claim 15, wherein the resource provider comprises one of a plurality of resource providers having different resource provider policies for using available resources that are managed by the resource manager.

19. A computer program product for managing content delivery within a network, the computer program product being embodied in a non-transitory computer readable storage medium and comprising computer instructions for:
 receiving a specification from a node of the network registered as a resource consumer to facilitate servicing of requests for a content item published by the resource consumer based on a resource consumer policy for servicing requests for the content item;
 receiving a specification from a node of the network registered as a resource provider of a resource provider policy for using a content delivery service available at the resource provider;
 determining that the resource consumer policy for servicing requests for the content item and the resource provider policy for using the available content delivery service are compatible;
 selecting the resource provider to service at least a subset of requests for the content item;
 facilitating caching of the content item at the resource provider; and
 redirecting, by a content redirect action of a communication protocol supported by the network, a received client request for the content item to the resource provider for servicing, wherein the resource provider is configured to service the client request by providing the content item to the requesting client.

20. The computer program product of claim 19, wherein the resource provider comprises one of a plurality of resource providers having different resource provider policies for using available resources that are managed by the resource manager.

* * * * *